Patented Feb. 16, 1926.

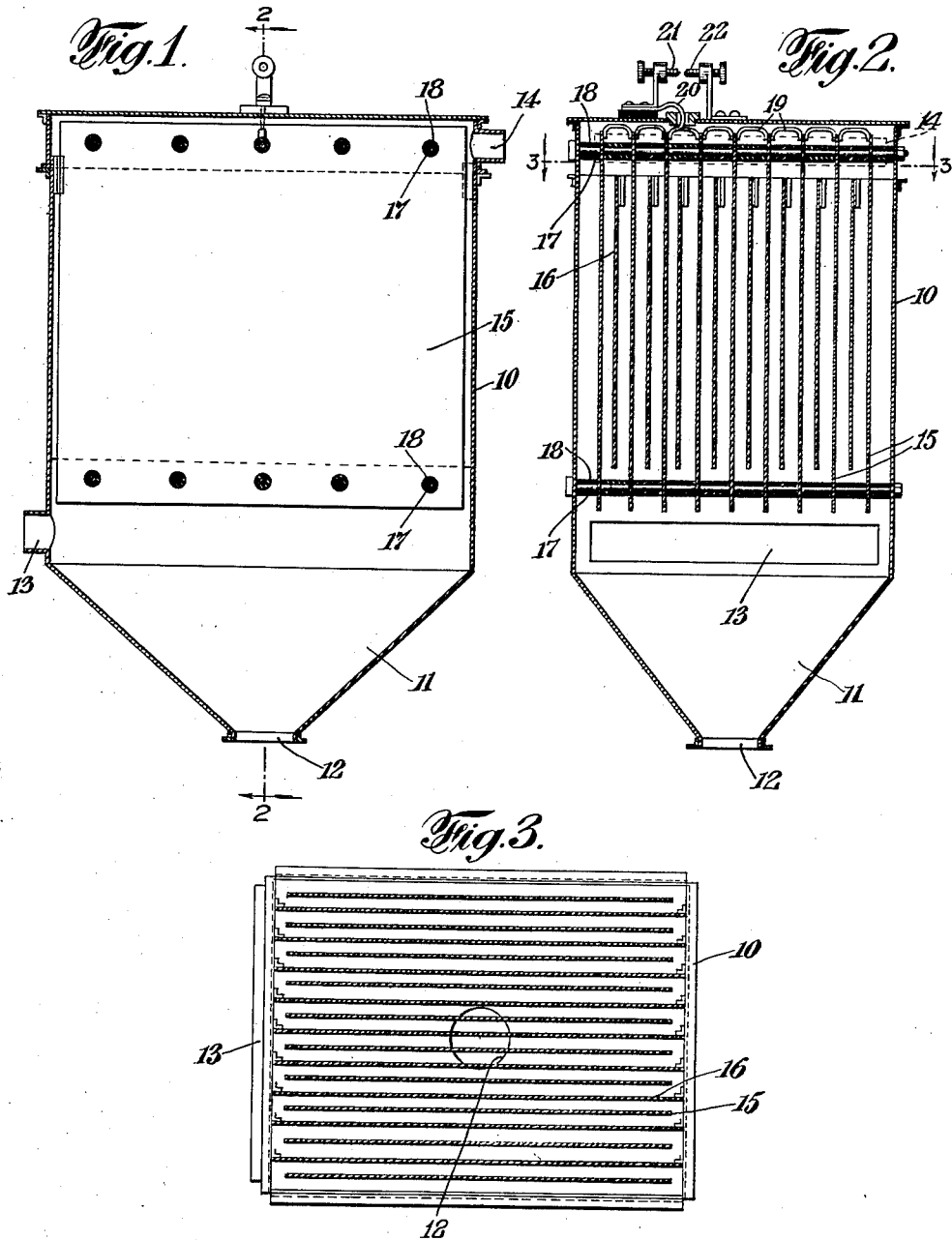

1,573,376

UNITED STATES PATENT OFFICE.

WALTER H. DICKERSON, OF EAST ORANGE, NEW JERSEY, AND WHARTON B. McLAUGHLIN, OF NEW YORK, N. Y.; SAID DICKERSON ASSIGNOR TO INDUSTRIAL WASTE PRODUCTS CORPORATION, OF DOVER, DELAWARE, A CORPORATION OF DELAWARE; CELIA BROWN McLAUGHLIN ADMINISTRATRIX OF SAID WHARTON B. McLAUGHLIN, DECEASED.

POWDER COLLECTOR.

Application filed April 11, 1923. Serial No. 631,480.

*To all whom it may concern:*

Be it known that we, WALTER H. DICKERSON and WHARTON B. McLAUGHLIN, citizens of the United States, and residents of East Orange and New York, respectively, in the counties of Essex and New York, respectively, and States of New Jersey and New York, respectively, have invented certain new and useful Improvements in Powder Collectors, of which the following is a specification.

The invention relates to collector apparatus for fine particles as suspended in a gaseous medium, for example such as result in spray-drying or dehydrating processes and in which the individual particles acquire generally more or less of a charge of electricity.

It has for its object to eliminate the use of moisture in the scrubbing of gases and to provide a dry collector apparatus wherein not only will the effluent gaseous medium be entirely freed of any solid particles, but the particles themselves will be, also, substantially freed of their respective charges of electricity.

To this end, the invention consists in providing within a suitable casing, thru which is to be passed the effluent gaseous medium containing the suspended and charged particles, impingement surfaces against which the charged particles may strike and upon which they accumulate until a discharge takes place, as for example, thru an associated spark-gap, whereupon the particles drop freely from the surfaces by gravity.

It is to be understood that this apparatus is suitable for use with effluent gaseous media containing suspended particles which have attained a charge previous to their entrance into the collector. For example, it has been noted, in the spray-drying or spray-dehydrating processes, that the individual particles acquire an electrostatic charge which is found to be more marked in the production of anhydrous material than in the case of material which is merely dried; but in either instance, there is danger of a sufficient charge accumulating to produce a spark. In the case of materials of a combustible or explosive nature, the production of a spark might result seriously; and the invention has for a further object to insure that when a discharge does take place it may be outside of the collector and apart from the combustible powder.

The invention has for a still further object to provide a more efficient type of collector. While with some materials it is possible to collect a fairly high percentage of the solid matter contained in the effluent gaseous medium, as by means of a "cyclone collector," yet with other materials it is necessary to resort to "bag collectors." Instances are known, in connection with the use of such "bag collectors" with readily combustible material, where an electric discharge has caused the apparatus to be set on fire. Moreover, bag collectors are very expensive both as to installation and maintenance; and are not always practicable because of the high final temperature necessary in the dehydration or drying of certain materials.

The type of collector forming the subject matter of the present invention is of a simple and inexpensive construction, involves no expense for maintenance, and operates at high efficiency.

The nature of the invention, however, will best be understood when described in connection with the accompanying drawings, in which—

Fig. 1 is a vertical section thru the improved collector.

Fig. 2 is a transverse section therethru taken on the line 2—2, Fig. 1, looking in the direction of the arrows.

Fig. 3 is a horizontal section taken on the line 3—3, Fig. 2, looking in the direction of the arrows.

Similar characters of reference designate corresponding parts thruout the several views.

Referring to the drawings which illustrate, by way of example, a vertical type of collector, 10 designates rectangular casing provided at the bottom with a conical mouth 11 from which the powder is to be discharged as thru an opening 12. The effluent gaseous medium, containing the fine and charged particles of solid matter, may be directed either horizontally or vertically thru the collector; and in the vertical type shown, is directed thru an inlet 13 provided at the bottom and an outlet 14 at the top for this purpose, all of which is well understood and forms no particular part of the invention.

The invention consists more especially in the provision within the casing of means against which the charged solid particles may impinge and to which means they may impart their charges. In other words, there is provided therein a form of air type electric condenser; and to this end, a plurality of vertically disposed plates 15 and 16, alternating with each other, are arranged to provide two electrically separated sets of plates. The plates 15 of the one set, for example, are electrically connected to one another and are arranged to be insulated from the other set of plates 16. This may be effected as by means of bolts 17 of insulation material passing thru the said plates 15, which are, further, properly spaced from each other and with respect to the plates 16 by insulated spacing sleeves 18 fitting over the bolts and between the plates. The said plates 15 may be connected in multiple thru suitable wires 19, which in turn thru a lead 20 are arranged to be in electrical connection with one electrode 21 of a spark-gap device mounted on the casing, but with electrode 21 insulated therefrom. The other electrode 22 of this device is preferably electrically connected to the casing to which is also, preferably, then connected the set of plates 16 and properly spaced in relationship to the set of plates 15. This provides substantially an air type of plate condenser with spark-gap connected across the two sets of plates of the condenser. The electrodes 21 and 22 are in the nature of adjustable screws so that the gap may be varied as desired and in manner well understood.

As the effluent gases pass thru the collector, the charged particles thereof impinge against and adhere to the plates; and it has been observed that the collection takes place almost completely within a few inches at the side at which the gaseous medium enters. For instance, when the gas is directed vertically, as in being introduced at the bottom of the collector as shown and passing vertically between the plates, the powdered product collects along the lower edges of the said plates. In thus accumulating thereon, there is communicated to the plates the charges of the particles; and when the charge becomes sufficiently high, a spark-over results between the plates or from one plate to another when the spark-gap is not set for operation. However, when operating with powder of a combustible or of an explosive nature, the electrodes 21 and 22 will be so adjusted that the gap between same is less than the distance between the plates so that the discharge will take place between the electrodes and outside of the collector. When a discharge takes place, the accumulated mass of powder on the surfaces of the plates, if of sufficient quantity, will drop by gravity to the collecting hopper or mouth 11 below the plates and may be removed thru the outlet 12 in any suitable manner.

We claim:—

1. A collector for finely divided charged particles suspended in a gaseous medium, comprising a casing provided with an inlet and outlet for the gaseous medium, and an uncharged electric condenser within said casing to collect the particles suspended in the gaseous medium passing thru the collector and to remove from said particles charges of electricity.

2. A collector for finely divided charged particles suspended in a gaseous medium, comprising a casing provided with an inlet and outlet for the gaseous medium, an electric condenser within said casing to collect the particles suspended in the gaseous medium passing thru the collector and to remove from said particles charges of electricity, and a spark discharge device connected with the terminals of said condenser.

3. A collector for finely divided charged particles suspended in a gaseous medium, comprising a casing provided with an inlet and outlet for the gaseous medium, and an uncharged plate condenser within said casing, the plates providing passageways for the effluent gaseous medium and being adapted to collect the suspended particles therefrom and to remove from said particles charges of electricity.

4. A collector for finely divided charged particles suspended in a gaseous medium, comprising a casing provided with an inlet and outlet for the gaseous medium, a plate condenser within said casing, the plates providing passageways for the effluent gaseous medium and being adapted to collect the suspended particles therefrom and to remove from said particles charges of electricity, and a spark discharge device connected with the sets of plates.

5. A collector for finely divided charged particles suspended in a gaseous medium, comprising a casing provided with an inlet and outlet for the gaseous medium, a plate condenser within said casing, the plates providing passageways for the effluent gaseous medium and being adapted to collect the suspended particles therefrom and to remove from said particles charges of electricity, and adjustable spark discharge means connected with the sets of plates.

6. A collector for finely divided charged solid particles suspended in a gaseous medium, comprising a collecting vessel having an inlet and an outlet for the gaseous medium, a series of alternately connected electrically conductive impingement plates or baffles mounted therein, the two sets of plates being insulated from each other, and a spark-gap having its electrodes connected to the respective sets of plates.

7. A collector for finely divided charged solid particles suspended in a gaseous medium, comprising a metal casing provided with an inlet and an outlet for the gaseous medium, a set of metal plates electrically connected with said casing and a set of plates insulated from said casing and the first named plates and located in spaced relationship thereto, and spark discharge means having its electrodes connected with the respective sets of plates.

Signed at New York, in the county of New York and State of New York, this 30th day of March, A. D. 1923.

WALTER H. DICKERSON.
WHARTON B. McLAUGHLIN.